United States Patent
Loomis et al.

(10) Patent No.: US 7,810,134 B2
(45) Date of Patent: Oct. 5, 2010

(54) AUTHENTICATION SYSTEM FOR FINANCIAL TRANSACTIONS

(75) Inventors: Nancy B. Loomis, San Diego, CA (US); Takayuki Kubo, Herrenberg (DE)

(73) Assignee: First Data Corporation, Greenwood Village, CO (US)

( * ) Notice: Subject to any disclaimer, the term of this patent is extended or adjusted under 35 U.S.C. 154(b) by 919 days.

(21) Appl. No.: 11/625,707

(22) Filed: Jan. 22, 2007

(65) Prior Publication Data

US 2008/0178258 A1    Jul. 24, 2008

(51) Int. Cl.
*G06F 21/00* (2006.01)
(52) U.S. Cl. .................. 726/2; 705/74; 705/75
(58) Field of Classification Search ........... 726/2; 705/74, 75
See application file for complete search history.

(56) References Cited

U.S. PATENT DOCUMENTS

| | | | |
|---|---|---|---|
| 3,823,308 A | 7/1974 | Goldberg | |
| 3,852,571 A | 12/1974 | Hall | |
| 3,896,266 A | 7/1975 | Waterbury | |
| 4,471,216 A | 9/1984 | Herve | |
| 5,053,606 A | 10/1991 | Kimizu | |
| 5,122,950 A * | 6/1992 | Benton et al. | 705/44 |
| 5,416,306 A | 5/1995 | Imahata | |
| 5,532,464 A | 7/1996 | Josephson | |
| 5,679,938 A | 10/1997 | Templeton | |
| 5,708,422 A | 1/1998 | Blonder et al. | |
| 5,750,972 A | 5/1998 | Botvin | |
| 5,770,843 A | 6/1998 | Rose | |
| 5,778,178 A | 7/1998 | Arunachalam | |
| 5,793,028 A | 8/1998 | Wagener | |
| 5,870,456 A | 2/1999 | Rogers | |
| 5,883,810 A | 3/1999 | Franklin | |
| 5,903,878 A | 5/1999 | Talati et al. | |
| 5,907,801 A | 5/1999 | Albert | |
| 5,907,832 A | 5/1999 | Pieterse | |
| 5,963,917 A | 10/1999 | Ogram | |
| 5,987,500 A | 11/1999 | Arunachalam | |
| 6,029,150 A | 2/2000 | Kravitz | |
| 6,052,675 A | 4/2000 | Checchio | |
| 6,212,556 B1 | 4/2001 | Arunachalam | |
| 6,226,624 B1 | 5/2001 | Watson et al. | |
| 6,327,578 B1 * | 12/2001 | Linehan | 705/65 |
| 6,497,359 B1 | 12/2002 | Chihara | |

(Continued)

FOREIGN PATENT DOCUMENTS

AU    199928111 B2    6/2002

(Continued)

*Primary Examiner*—Edan Orgad
*Assistant Examiner*—Bradley Holder
(74) *Attorney, Agent, or Firm*—Townsend and Townsend and Crew LLP (57) ABSTRACT

In one embodiment, a computerized method for authenticating a financial account when making a purchase utilizes a merchant computer system which receives a purchase request from an account holder. The merchant computer system prepares transaction data that comprises account holder account data and authentication information. The transaction data is transmitted to a financial institution of the account holder. Subsequently, the merchant computer system receives the authentication information that was obtained by the account holder from the financial institution. The authentication information from the account holder is analyzed and future transactions are authenticated if the authentication information is correct.

25 Claims, 5 Drawing Sheets

U.S. PATENT DOCUMENTS

| | | | |
|---|---|---|---|
| 6,853,973 B2* | 2/2005 | Mathews et al. | 705/1 |
| 7,110,981 B1* | 9/2006 | Sidikman et al. | 705/43 |
| 7,292,996 B2* | 11/2007 | Nobrega et al. | 705/39 |
| 7,366,702 B2* | 4/2008 | David | 705/67 |
| 7,430,537 B2 | 9/2008 | Templeton et al. | |
| 2001/0037253 A1* | 11/2001 | Kensey | 705/26 |
| 2002/0004772 A1 | 1/2002 | Templeton et al. | |
| 2002/0077837 A1 | 6/2002 | Krueger et al. | |
| 2002/0107791 A1* | 8/2002 | Nobrega et al. | 705/39 |
| 2002/0120846 A1* | 8/2002 | Stewart et al. | 713/168 |
| 2002/0143708 A1 | 10/2002 | Hollander et al. | |
| 2003/0125973 A1* | 7/2003 | Mathews et al. | 705/1 |
| 2004/0078324 A1 | 4/2004 | Lonnberg et al. | |
| 2004/0243518 A1 | 12/2004 | Clifton et al. | |
| 2005/0165682 A1* | 7/2005 | Duke | 705/41 |
| 2006/0178958 A1 | 8/2006 | Abdelfattah et al. | |
| 2007/0094901 A1* | 5/2007 | Kibbe et al. | 40/124.06 |
| 2008/0027821 A1* | 1/2008 | Burton | 705/26 |
| 2008/0120235 A1* | 5/2008 | Chu | 705/44 |

FOREIGN PATENT DOCUMENTS

| | | |
|---|---|---|
| AU | 200197079 B2 | 6/2002 |
| DE | 19926472 | 11/2001 |
| EP | 400911 B1 | 12/1990 |
| EP | 519843 A3 | 12/1992 |
| EP | 527639 A2 | 2/1993 |
| EP | 216521 B1 | 4/1997 |
| EP | 848360 A1 | 6/1998 |
| WO | WO 95/06294 | 3/1995 |
| WO | WO 95/16971 | 6/1995 |
| WO | WO 97/13228 A1 | 4/1997 |
| WO | WO 99/08242 | 2/1999 |
| WO | WO 99/23622 A1 | 5/1999 |
| WO | WO 99/66436 A1 | 12/1999 |

\* cited by examiner

JOHN WILLIAMS
PRIME CHECKING

TRANSACTION HISTORY

| | | |
|---|---|---|
| 1/1/07 | AX7123 | $0.00 |
| 1/1/07 | SONG #1 | -$0.97 |
| 1/1/07 | SONG #1 | -$1.00 |
| 1/1/07 | SONG #1 REBATE | +$0.03 |
| 1/1/07 | SONG #1 X2!RV3 | -$0.97 |

AUTHENTICATION SYSTEM FOR FINANCIAL TRANSACTIONS

BACKGROUND OF THE INVENTION

This invention relates generally to the field of authentication, and in particular to authenticating an account holder. In one specific aspect, the invention relates to authenticating an account holder when making a card not present transaction, such as over the Internet or the phone.

Fraud involving stolen credit or debit account numbers is a major concern for financial institutions worldwide. This risk of fraudulent transactions occurring with card present transactions is significantly less than with card not present transactions. This is primarily because the clerk can check to make sure there is a physical card and that the signature on the card matches the signature on the receipt.

For card not present transactions, these precautions are not available. As such, if an account number is stolen and provided over the Internet, there is no effective way to verify this fact. While debit cards often have an associated personal identification number (PIN), card holders generally do not disclose this information over the Internet because of additional security concerns.

One attempt at dealing with these issues is disclosed in published U.S. patent application Ser. No. 20020004772, entitled "System and Method for Verifying a Financial Instrument," which is herein incorporated by reference. This approach requires the card holder to pre-register before making an Internet transaction. As part of this pre-registration process, funds are deposited into the card holder's account. The card holder is then required to view his or her transactions to see the amount deposited. However, this process requires two transactions (and associated fees) in order to consummate a purchase. Also, if no purchase is made, the card holder receives a free deposit of funds.

This application provides other solutions for authenticating an account holder. Features and advantages of such solutions are set forth below.

BRIEF SUMMARY OF THE INVENTION

In one embodiment, the invention provides a computerized method for authenticating a financial account when making a purchase. According to the method, a merchant computer system receives a purchase request from an account holder. The merchant computer system prepares transaction data that comprises account holder account data and authentication information. This authentication information will typically be different from traditional authenticators such as PINs and CVV values. The transaction data is transmitted to a financial institution of the account holder. Subsequently, the merchant computer system receives the authentication information that was obtained by the account holder from the financial institution. In other words, the account holder obtains the authentication information from his financial institution and then provides this back to the merchant. The authentication information from the account holder is analyzed to determine if the authentication information is correct. If not, the account may be flagged so that subsequent transactions may be denied. In this way, an account holder may be authenticated as part of a purchase transaction. In some cases, this also reduces transaction fees because the user may be authenticated using a single transaction.

In one particular aspect, the authentication information is the purchase amount less a certain credit. For example, if a purchase was for $1.00, the amount posted to the account may be $0.97. This credit amount may be randomly generated to reduce the risk that a fraudulent user may guess the debit amount.

In another aspect, the purchase amount may be zero and the authentication information may comprise a text message. In this way, the account is not credited, but simply shows a text message that the account holder can provide to the merchant. This can be randomly generated characters, or a readable message, such as "baseball". Such a message could also be used in combination with a credit or a rebate.

In another option, the authentication information may comprise a rebate posted to the account holder's account. For example, the account may be posted with the purchase amount, with a separate entry showing a rebate or an entry showing a credit.

In one particular feature, the authentication information is included in an ISO 200 message format. In this way, a standard transaction data format may be used to both post the transaction and to provide authentication information to the account holder.

In still another aspect, the transaction data further comprises merchant identification data. For example, the account may be posted with the name of the merchant. Also, the transaction data may be transmitted to a third party payment network (also referred to as a payment processing system) which in turn transmits the transaction data to the account holder's financial institution.

In another embodiment, the invention provides an authentication method that comprises receiving from a merchant at a financial institution computer system account holder transaction data comprising account holder account data and authentication information. The financial institution computer also receives a request from the account holder to access the authentication information. The authentication information is provided to the account holder who in turn may report back to the merchant in order to be authenticated.

According to one aspect, the authentication information is transmitted over the Internet to a user computer. As another option, the authentication information is transmitted over a phone network to a user phone.

In another aspect, the authentication information is the purchase amount less a certain credit that may be randomly generated. As one option, the purchase amount is zero and the authentication information comprises a text message. In a further option, the authentication information comprises a rebate posted to the account holder's account. Further, the authentication information may be included in an ISO 200 message format.

In still another embodiment, the invention provides an authentication system comprising a merchant computer system that is configured to receive a purchase request from an account holder, to prepare transaction data that comprises account holder account data and authentication information, and to transmit the transaction data to a financial institution of the account holder. The merchant computer system is further configured to receive the authentication information which the account holder obtained from the financial institution and to analyze the authentication information from the account holder. Further, the merchant computer system is also configured to proceed with subsequent purchase requests if the authentication information is correct.

The system may further include a payment processing system that is configured to receive the transaction data from the merchant computer system and to transmit the transaction data to the financial institution. In one aspect, the authentication information comprises the purchase amount less a certain credit that may be randomly generated. In another aspect, the purchase amount is zero and the authentication information comprises a text message. The authentication information may also comprise a rebate posted to the account holder's account.

In one particular arrangement, the authentication information is included in an ISO 200 message format. The transaction data may further comprise item purchase data.

DETAILED DESCRIPTION OF THE INVENTION

The invention provides a merchant with the ability to authenticate an account holder when performing a card not present transaction. Such transactions may originate from Internet purchases, phone order purchases, mail in purchases and the like. Also, the authentication techniques of the invention may be used with a wide variety of financial accounts and payment instruments. Merely by way of example, the authentication techniques may be used with open or closed loop debit cards, credit cards, stored value cards and the like. Also, the payment instruments associated with such financial accounts may have account information stored on a wide variety of media, such as magnetic stripes, bar codes, microprocessors, RF memory chips and the like. However, when making card not present transactions, the account information is usually provided to the merchant without the use of such presentation instruments. For example, when making an Internet purchase, the information is usually typed into a web page of the merchant. For phone purchases, the account information is provided over the phone. As such, the merchant has no way to verify that the information is coming from the true account holder.

In certain embodiments, the account holder may be verified by determining whether the account holder is able to access his or her financial account. In other words, the account holder is asked to access his or her financial account, and then report back some unique information that was posted to the account from the merchant or a trusted affiliate of the merchant (such as the merchant's payment processor). One feature of the invention is that such authentication information may be posted to the account holder's account as part of the purchase transaction. In this way, the account holder does not need to be pre-registered or pre-authenticated prior to performing a transaction. Further, only one transaction fee is incurred since only one transaction occurs. However, it will be appreciated that the account holder may pre-register using the techniques described herein.

A wide variety of authentication information may be posted to the account holder's account as part of the authentication process. For example, one way is simply to reduce or increase the purchase amount that is posted to the account. As one example, the user may wish to purchase a song to download at a cost of $1.00. The merchant may decide to credit the account by $0.04 as part of the authentication process. As such, when the user accesses his or her account, the account will have a posting of $0.96. This information may then be provided back to the merchant by the account holder so that the transaction may be finalized.

As another option, the transaction could be a zero dollar transaction, with a text message. For example, the account may have a posting of $0.00 and a message such as "DIW72!$" or "pudding". This information may then be provided back to the merchant to authenticate the user who may proceed with the purchase transaction.

In some cases, a combination of both a credit and a message may be provided. For instance, the account could be posted with $0.96 along with a "pudding" message. For convenience, the text message could be included in the same line with the merchant identifier. As an example, if the merchant were TOYS, the account could be posted with TOYS %Y811. The authentication piece could simply be the %Y811 or the whole message.

One particular technical consideration is the industry recognized format for which purchase transactions are transmitted. For debit transaction, an industry standard format is the ISO 200 message format. According to this format, a credit or debit may be authorized in addition to the purchase amount. This is by using a "transaction fee field" in the transaction message. The transaction fee field may be characterized as a credit which reduces the amount of the total purchase. The transaction fee field may be randomly generated by the merchant to prevent a fraudulent user from guessing the posted amount. In some cases, fields other than the "transaction fee field" could be used to include the authentication information and may include text as well as numbers. Text and/or other messages may also be randomly generated by the merchant.

If the authentication information is incorrect, the account holder may be provided with the opportunity to reenter. If still incorrect, any subsequent transactions may be prevented, i.e. by flagging the account. For micropayments (which are typically a low dollar amount), the consequence of a fraudulent transaction is relatively minor. If a request for a first time transaction is larger than a micropayment, the merchant may put limits on the transaction amount so as to reduce the risk of a fraudulent transaction.

In many cases, the merchant creates the authentication information which is ultimately provided to the financial institution. However, such functionally may also be performed by a delegate of the merchant, such as a payment processor used to process the payment for the merchant.

Figure 1:
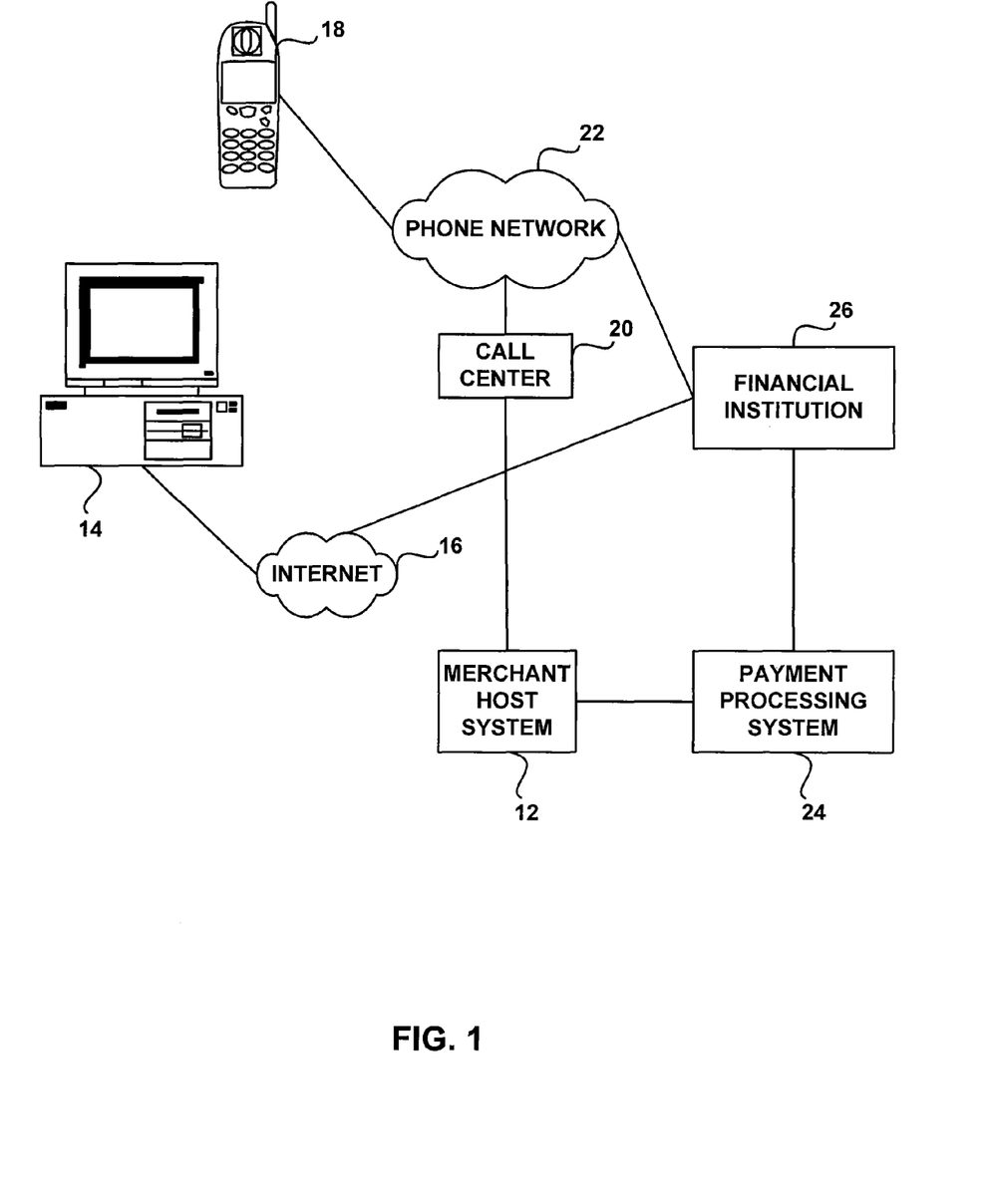
FIG. 1 is a schematic diagram of an exemplary authentication system according to the invention.

Referring now to FIG. 1, one system 10 that may be used to authenticate an account holder will be described. Conveniently, system 10 may also be used by the account holder to select a purchase and to pay for the requested goods and services. System 10 includes a merchant host computer system 12. Merchant host 12 may be used to render web pages on various user computers, such as user computer 14 which operates over the Internet 16. However, it will be appreciated that a wide variety of networks may be used to communicate with merchant host 12.

One particular feature of merchant host system 12 is that it may be used to offer various goods or services for sale. For example, merchant host system 12 may be operated by a retailer and offer such items as clothing, electronics, music or other digital content that may be downloaded, other commercial goods and services, and the like. Using computer 14, a purchaser may access merchant host 12 and visualize items or services that are offered for sale. Once selecting these goods or services, the user may enter a purchaser request using computer 14. Such information that may be entered into computer 14 include items such as the user's name, account number, home address, billing address, shipping address, download location, and the like.

Also, it will be appreciated that other systems and devices may be employed to select and purchase goods or services from merchant host system 12. For example, a mobile device 18, such as a mobile phone, PDA, or the like may be used to contact a call center 20 over a phone network 22. The call center 20 may include a voice response system or a live operator which permits the user of mobile device 18 to select a good or service to purchase and to provide the necessary payment information similar to that described in connection with computer 14. As one particular example, a mail order catalogue may be sent to a potential purchaser who may select an item and then arrange for its purchase using mobile device 18. At call center 20, the information provided by the user in order to complete the transaction is passed on to merchant host system 12.

System 10 may also utilize a payment processing system 24 that permits merchant host 12 to interface with a financial institution 26. Payment processing system 24 may be any one of a variety of payment processing systems used to process debit transaction, credit card transactions, stored value transactions, and the like. By way of example, payment processing system 24 may comprise a debit network, such as the STAR network, operated by First Data Corporation. Other types of networks include the NYCE, PULSE and EXCHANGE networks. Payment processing system 24 may also comprise a credit card network.

Payment processing system 24 collects information from merchant host 12, such as an account holder's name, account address, purchase information, transaction amount information, and the like. This information is passed on to the user's financial institution 26 which debits the user's account and sends a confirmation of payment back to processing system 24 and to merchant host system 12 as is known in the art.

One feature of the invention is that merchant host system 12 may be used to generate authentication information and pass this to financial institution 26. The user is then required to provide this authentication information back to host system 12 in order to authenticate the user. One way in which the user is able to obtain this authentication information is to access their account at financial institution 26. This may be done using user computer 14 over Internet 16 to access their online account. When accessing the online account, the user is able to see the posted authentication information and is then able to provide this back to merchant host system 12, such as over Internet 16. Authentication information may also be obtained from financial institution 26 through phone network 22, such as with mobile device 18 or other phone compatible equipment. If the correct authentication information is provided to host system 12, this information may be stored at host system 12 so that for future transactions, the user will be authenticated. If incorrect, the account may be flagged so that it will be prohibited from being used during subsequent transactions.

Figure 2:
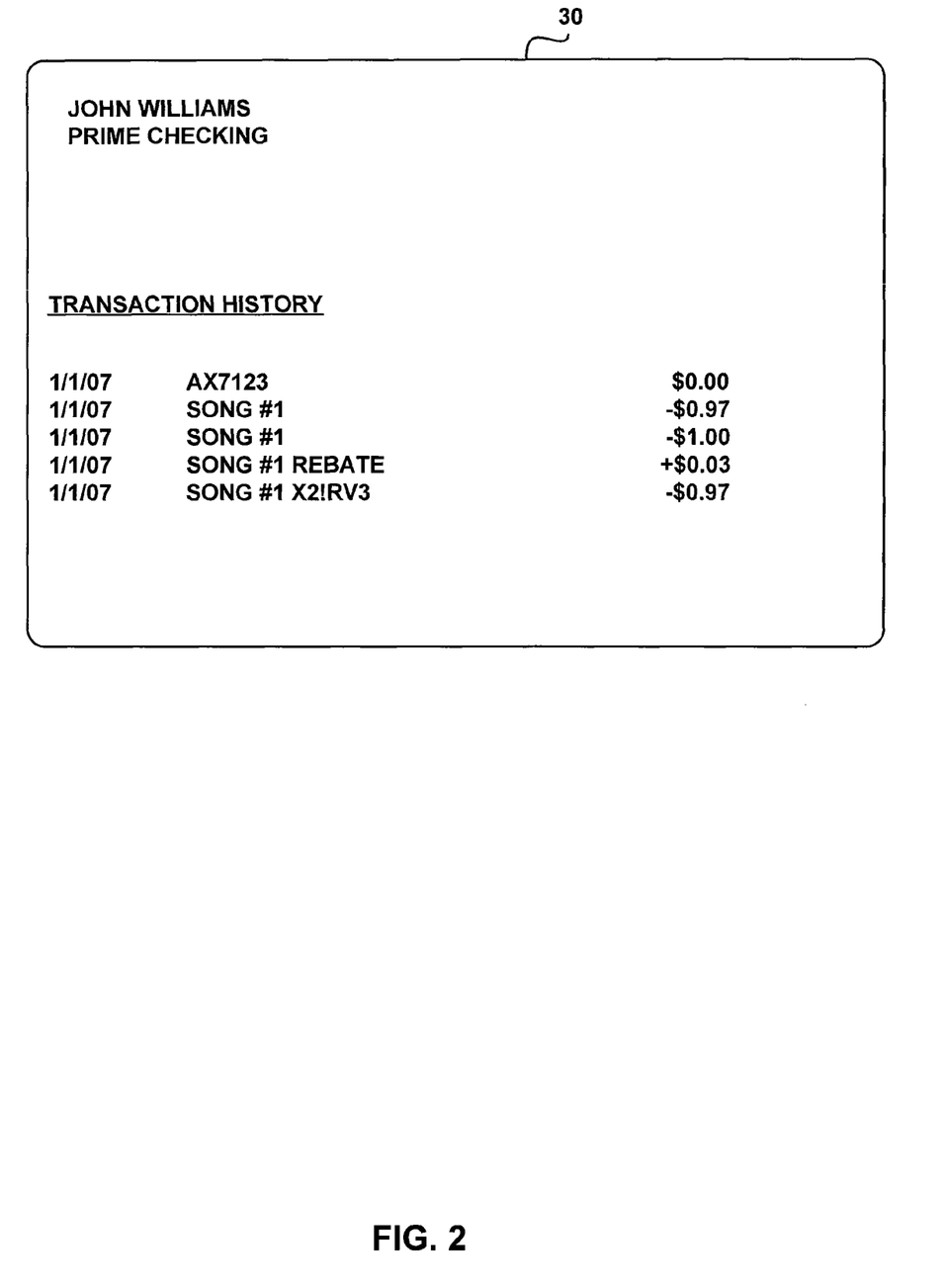
FIG. 2 is one example of a screen display providing authentication information to an account holder.

FIG. 2 illustrates one example of a screen display 30 that may be generated by financial institution 26 and displayed on the display screen of user computer 14 in order to provide the user with authentication information. To access display screen 30, the account holder typically logs into a website of the financial institution and enters their user name and password. Financial institution 26 then authenticates the user using its regular authentication protocols. Display screen 30 is then rendered on user computer 14 and may contain any one of a variety of authentication messages. Merely by way of example, display screen 30 illustrates five examples. However, other messages are possible.

One example of an authentication message in display screen 30 is a zero charge transaction with the ASCII message AX7123. This message be used by the account holder and provided to merchant host system 12 in order to authenticate the user. If correct, merchant host system 12 may then run the transaction for the specified transaction amount. The second transaction line in display screen 30 lists the name of a downloaded song along with a debit amount of 97 cents. The amount of 97 cents may be entered into a website from merchant host system 12 in order to authenticate the user. The 97 cent charge may be based on a download which costs one dollar along with a randomly generated credit of 3 cents that is generated by merchant host system 12.

The third line of display screen 30 also lists the name of a downloaded song with a one dollar debit. The next line also indicates a rebate for song number one of 3 cents. In this example, the purchaser may be asked to enter into the merchant website the amount of the rebate. As such, if the user enters in 3 cents, the user will be authenticated.

Finally, the last transaction line of display screen 30 indicates the name of the song downloaded plus a message along with a charge of 97 cents. This example includes both a randomly generated message of X2!RV3 along with a randomly generated 3 cent credit. Hence, the user could be required to enter the randomly generated message, the reduced debit of 97 cents, or both. Further, it will be appreciated that any combination of any of the above examples may be used as well.

Figure 3:
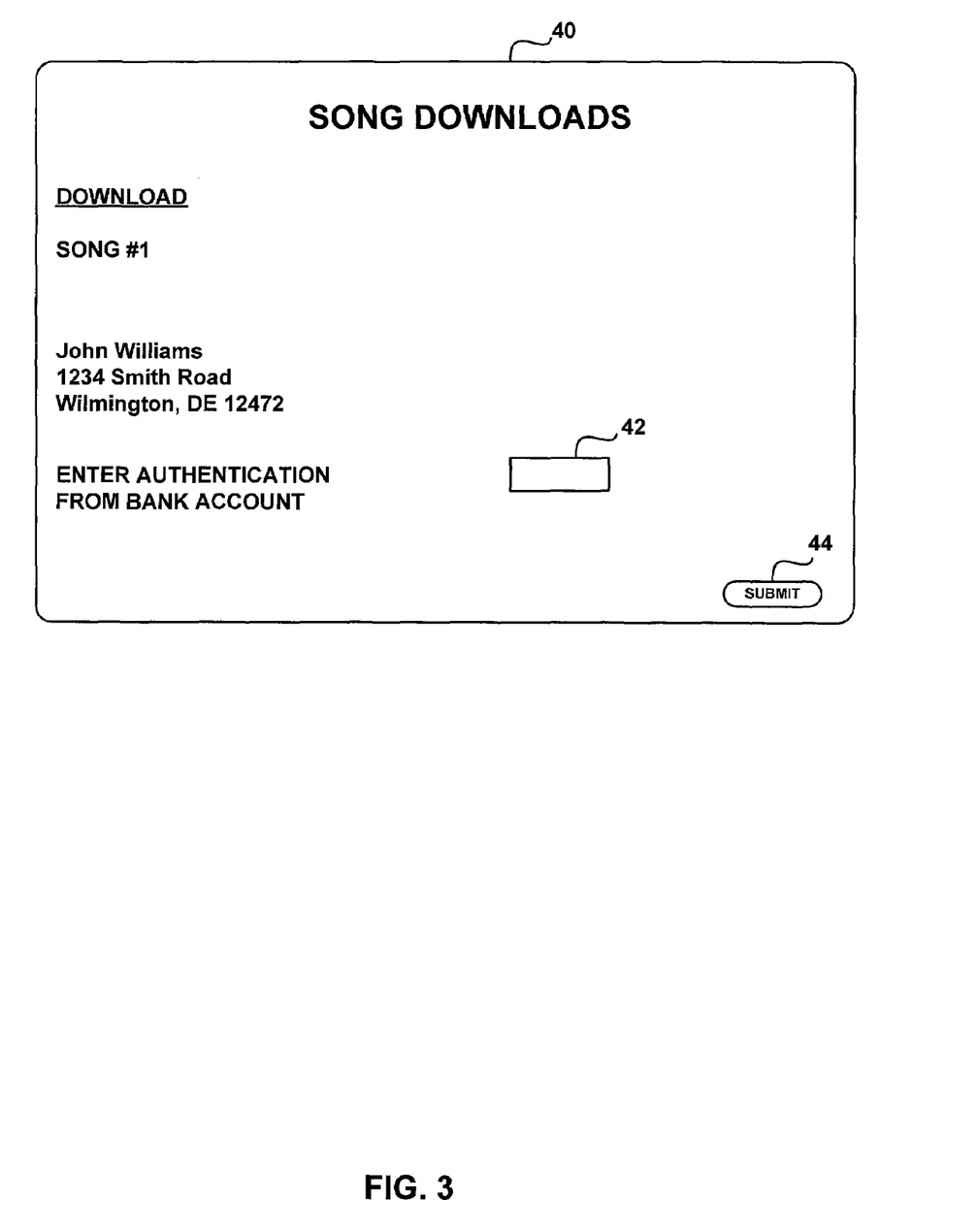
FIG. 3 is one example of a screen display provided by the merchant to permit the account holder to enter authentication information.

FIG. 3 illustrates one example of a display screen 40 that may be rendered on user computer 14 by merchant host system 12 to permit the purchaser to enter the authentication information received from financial institution 26. Display screen 40 includes a box 42 where the authentication information from the financial institution may be entered. Once this information is entered, the user may select a submit icon 44 to transmit this information to merchant host system 12. In the example of display screen 40, the user is shown to be purchasing a song and has already entered his personal information which is displayed on display screen 40.

Figure 4A:
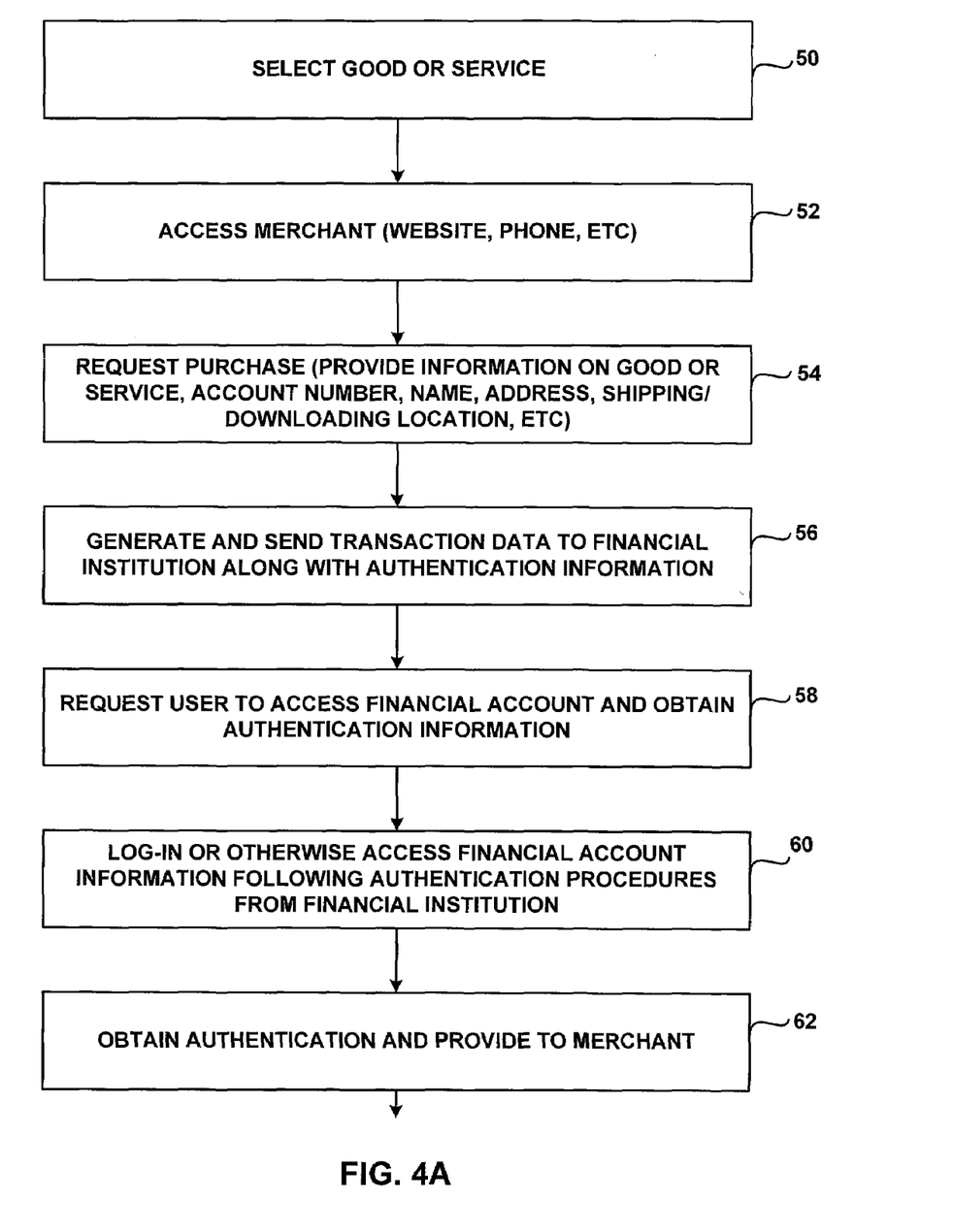
FIGS. 4A and 4B are flowcharts illustrating one exemplary method for authenticating an account holder according to certain embodiments.
Figure 4B:
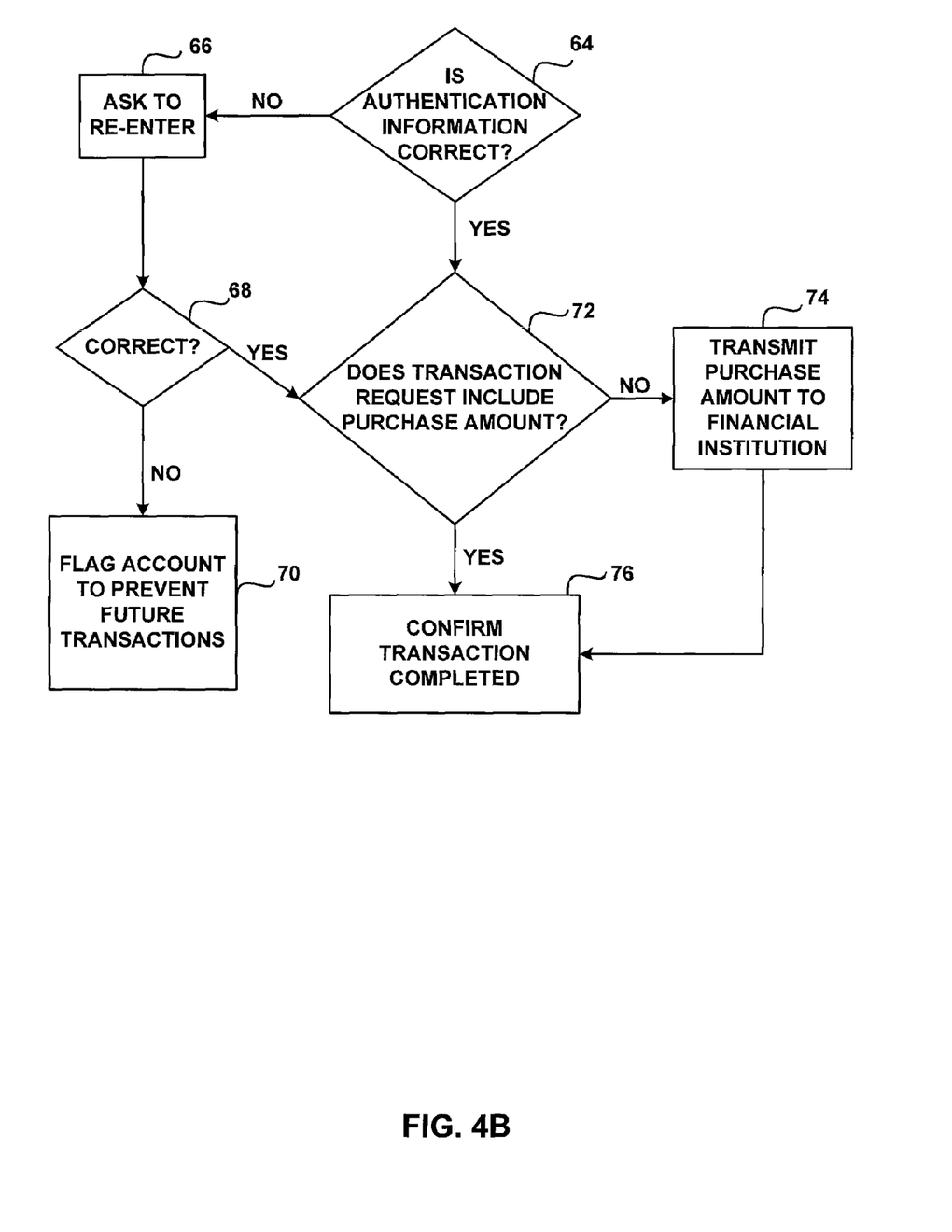

Referring now to FIGS. 4A and 4B, one example of a method that may be used to authenticate a user during a purchase transaction will be described. The process of FIGS. 4A and 4B begins at step 50 where the user selects a good or service. This may be done from a merchant website, a merchant catalog, from a mailing or other advertisement, or the like. In step 52, the user accesses the merchant, through a website portal, from portal, or the like. In step 54, the purchaser requests to purchase the good or service. Along with this request, the purchaser may provide information on the good or service, an account number for the account used to make payment, the purchaser's name, address, a shipping or downloading location, or the like.

After the purchaser has entered the requested purchaser information, the appropriate transaction data is forwarded to a financial institution along with authentication information. This authentication information may be randomly generated by the merchant and may be a message, credit, debit, rebate, or the like. In step 60, the purchaser logs in or otherwise accesses his or her financial account information following authentication procedures from the financial institution. Once the authentication information is obtained from the financial institution, it is provided back to the merchant by the purchaser as illustrated in step 62.

In step 64, the merchant analyzes the authentication information to see if it is correct. If it is not, the purchaser may be asked to re-enter as illustrated in step 66. If the information is correct as shown in step 66, the process may proceed to step 72 as will be described hereinafter. If not, the account may be flagged to prevent future transactions as illustrated in step 70. In case of debit transactions, the user's account may already be posted with a debit, making it impossible to reverse the charge.

In step 72, the authentication information is correct and an analysis is performed to see if the transaction request includes a purchase amount. If not, the purchase amount is transmitted to the financial institution as shown in step 74 so that the transaction may be compiled and confirmed as illustrates in step 76. If the transaction request initially included a purchase amount, this will already be posted at the financial institution and will not need to be retransmitted.

When using the debit network, one particular advantage of the message may be in that in the ISO 200 message format. One advantage of this feature is that the authentication information may be included directly into an industry standard financial transaction format.

Posted below in Table 1 is one example of ISO 200 fields that may be used in a transaction that may be used in accordance with the invention. As shown, data element P-004 is the amount of the transaction. Data element P-028 shows the transaction fee that will be applied. If the field includes a "D" the account will be debited to the total amount of the transaction. If a "C", the account will be credited. For example, if the transaction were for $1.00 and a "C" of $0.03 were included, the total charge posted would be $0.97.

TABLE 1

| Data Element | ISO Field Name | Data Type | Requirements Transmit | Receive | Notes |
|---|---|---|---|---|---|
| P-002 | Primary account number | LLVN19 | M | M | Required if PAN manually entered |
| P-003 | Processing Code | N6 | M | M | |
| P-004 | Amount Transaction | N12 | M | M | |
| P-007 | Transmission date and time | N10 | M | M | Updated by each processing end point |
| P-011 | Systems trace number | N6 | M | M | Processor assigned |
| P-012 | Local time | N6 | M | M | Local terminal time |
| P-012 | Local date | N4 | M | M | Local terminal date |
| P-015 | Settlement date | N4 | M | M | STAR bus date |
| P-018 | Merchant type (SIC) | N4 | M | C | |
| P-022 | POS Entry Mode | N2 | C | C | Required for POS |
| P-028 | Amount, Tran fee | X-N8 | C | C | Required if collecting fee or giving rebate. The sign on the field is either a D or C |
| P-032 | Acquiring Inst ID | LLVN11 | M | M | Acquiring members FRD-ABA (assigned by STAR is non FI) |
| P-037 | Retrieval ref Number | AN12 | M | M | Terminal sequence Number |
| P-041 | Card acceptor term ID | AN8 | M | M | |
| P-042 | Card acceptor ID | AN15 | C | C | Required for POS |
| P-043 | Card acceptor name and location | AN40 | M | M | Reg E data |
| P-048 | Merchant Bank Name | LLLVANS025 | M | C | Reg E data |
| P-058 | Nat POS condition code | LLLV N010 | M | M | Defines terminal type |
| P-063 | Pseudo term | AN6 | M | M | Pseudo term value |
| S-104 | Fee attribute | LLLV ANS100 | C | C | Required for POS transactions |

Listed in Table 2 is an example of an actual transaction that is transmitted to the financial institution with a credit. The transaction in Table 2 is in the ISO 200 format specified in Table 1 above. The original transaction amount is for $200.00, and the random credit amount is 5 cents. By changing the sign on the fee field, the transaction amount is $199.95. Hence, the transaction amount and fee fields work in conjunction with one another. When the account holder accesses her account, the amount she will see displayed in $199.95. This is the amount she may report back to the merchant to authenticate the transaction.

TABLE 2

AD0STII3 RECORD 4 FROM 01/03 13:46:15.67 IN ON WI3T11 SEQ: 00001
Msg-type=0200 Bit-map=F23A441108E18042 Xbit-map=0000000001000000

TABLE 2-continued

```
Pan=xxxxxxxxxxxx8004 Proc code=500000 Tran amt=000000019995
Tran datetime=0103184615 Trace nbr=269598 Local time=12:46:15 Local date=01/03
Sett date=01/03 Merchant=5511 Pos entry=012 Tran fee amt=C00000005
Acqr inst id=xxxxxxxxx Retr ref=000187269598 Crd acpt trmid=NNNXXX
Crd acpt id=xxxx Crd acpt loc=xxxx/xxxx Irving TXUS Name=xxxx Tran curr=840 Natl cond
code=1010100025 Ddsi data len=008 Ddsi data map=80
Pseudo term=183002 Tran descrip=NZ
```

The invention has now been described in detail for purposes of clarity and understanding. However, it will be appreciated that certain changes and modifications may be practiced within the scope of the appended claims.

What is claimed is:

1. A computerized method for authenticating a financial account when making a purchase; the method comprising:
receiving at a merchant computer system a purchase request from an account holder, wherein the purchase request includes account holder account data for an account that is to be used to make payment;
at the merchant computer system, preparing transaction data that comprises the account holder account data and authentication information, wherein the authentication information prepared by the merchant computer system is kept from the knowledge of the account holder such that the authentication information remains unknown to the account holder until the account holder accesses the authentication information from a financial institution of the account holder;
transmitting, by the merchant computer system, the transaction data to the financial institution of the account holder;
receiving at the merchant computer system the authentication information obtained by the account holder from the financial institution after the account holder has accessed the authentication information from the account at the financial institution using the account holder account data;
analyzing, by the merchant computer system, the authentication information from the account holder to determine whether the authentication information obtained from the account holder when accessing the account holder's account at the financial institution matches the authentication information prepared by the merchant computer system, and flagging the financial account as being authenticated for subsequent transactions if the authentication information matches.

2. A method as in claim 1, wherein the authentication information is the purchase amount less a certain credit.

3. A method as in claim 2, wherein the certain credit is randomly generated.

4. A method as in claim 1, wherein the purchase amount is zero and the authentication information comprises a text message.

5. A method as in claim 1, wherein the authentication information comprises a rebate posted to the account holder's account.

6. A method as in claim 1, wherein the authentication information is included in an ISO 200 message format.

7. A method as in claim 1, wherein the transaction data further comprises merchant identification data.

8. A method as in claim 1, wherein the transaction data is transmitted to a payment processing system which transmits the transaction data to the account holder's financial institution.

9. An authentication method comprising:
receiving from a merchant at a financial institution computer system account holder transaction data comprising account holder account data of an account of an account holder of the financial institution and authentication information, wherein the authentication information was prepared by the merchant and kept from the knowledge of the account holder;
posting the authentication information to the account of the account holder;
receiving at the financial institution computer a request from the account holder to access the authentication information, wherein the request includes the account holder account data of the account holder;
accessing, by the financial institution computer system, the account of the account holder using the account holder account data provided by the account holder;
after the step of accessing the account of the account holder, providing to the account holder the posted authentication information to permit the account holder to supply the authentication information to the merchant so that the merchant can compare the authentication information provided to the account holder by the financial institution with the authentication information provided to the financial institution by the merchant.

10. A method as in claim 9, wherein the authentication information is transmitted over the Internet to a user computer.

11. A method as in claim 9, wherein the authentication information is transmitted over a phone network to a user phone.

12. A method as in claim 9, wherein the authentication information is a purchase amount less a certain credit.

13. A method as in claim 12, wherein the certain credit is randomly generated.

14. A method as in claim 9, wherein a purchase amount is zero and the authentication information comprises a text message.

15. A method as in claim 12, wherein the authentication information comprises a rebate posted to the account holder's account.

16. A method as in claim 9, wherein the authentication information is included in an ISO 200 message format.

17. A method as in claim 9, wherein the transaction data further comprises merchant identification data.

18. An authentication system comprising:
a merchant computer system that is configured to:
receive a purchase request from an account holder, wherein the purchase request includes account holder account data for an account that is to he used to make payment,
to prepare transaction data that comprises the account holder account data and authentication information, wherein the authentication information prepared by the merchant computer system is kept from the knowledge of the account holder such that the authentication information remains unknown to the account holder until the account holder accesses the authentication information from a financial institution of the account holder, and to transmit the transaction data to the financial institution of the account holder;

wherein the merchant computer system is further configured to receive the authentication information obtained by the account holder from the financial institution after the account holder has accessed the authentication information from the account at the financial institution using the account holder account data, and to analyze the authentication information from the account holder to determine whether the authentication information obtained from the account holder when accessing the account holder's account at the financial institution matches the authentication information prepared by the merchant computer system; and wherein the merchant computer system is further configured to flag the account of the account holder as authenticated for subsequent transactions if the authentication information matches.

19. A system as in claim 18, further comprising a payment processing system that is configured to receive the transaction data from the merchant computer system and to transmit the transaction data to the financial institution.

20. A system as in claim 18, wherein the authentication information comprises the purchase amount less a certain credit.

21. A system as in claim 20, wherein the certain credit is randomly generated.

22. A system as in claim 18, wherein the purchase amount is zero and the authentication information comprises a text message.

23. A system as in claim 18, wherein the authentication information comprises a rebate posted to the account holder's account.

24. A system as in claim 18, wherein the authentication information is included in an ISO 200 message format.

25. A system as in claim 18, wherein the transaction data further comprises merchant identification data.

* * * * *